(12) United States Patent
Tabata

(10) Patent No.: US 7,025,500 B2
(45) Date of Patent: Apr. 11, 2006

(54) PROBE FOR INFRARED CLINICAL THERMOMETER

(75) Inventor: Makoto Tabata, Kyoto (JP)

(73) Assignee: Omron Corporation, Kyoto (JP)

( * ) Notice: Subject to any disclaimer, the term of this patent is extended or adjusted under 35 U.S.C. 154(b) by 429 days.

(21) Appl. No.: 10/150,497

(22) Filed: May 20, 2002

(65) Prior Publication Data

US 2002/0176478 A1 Nov. 28, 2002

(30) Foreign Application Priority Data

May 22, 2001 (JP) .............................. 2001-152411

(51) Int. Cl.
G01J 5/02 (2006.01)
G01K 1/01 (2006.01)

(52) U.S. Cl. ...................................... 374/121; 374/208

(58) Field of Classification Search ................ 374/208, 374/121, 158; 600/474, 549
See application file for complete search history.

(56) References Cited

U.S. PATENT DOCUMENTS

| 4,662,360 | A | * | 5/1987 | O'Hara et al. |
| 4,911,559 | A | * | 3/1990 | Meyst et al. |
| 5,066,142 | A | * | 11/1991 | DeFrank et al. |
| 5,088,834 | A | * | 2/1992 | Howe et al. |
| 5,179,936 | A | * | 1/1993 | O'Hara et al. |
| 5,906,437 | A | * | 5/1999 | Lin |
| 5,980,451 | A | * | 11/1999 | O'Hara et al. |
| 6,156,148 | A | * | 12/2000 | Beerwerth et al. |
| 6,195,581 | B1 | * | 2/2001 | Beerwerth et al. |
| 6,238,088 | B1 | * | 5/2001 | Wu |
| 6,347,243 | B1 | * | 2/2002 | Fraden |
| 6,371,639 | B1 | * | 4/2002 | Huang |
| 6,390,671 | B1 | * | 5/2002 | Tseng |

* cited by examiner

*Primary Examiner*—Gail Verbitsky
(74) *Attorney, Agent, or Firm*—Morrison & Foerster LLP

(57) ABSTRACT

A trunk section 11 constituted by a rigid member and a thin film section 12 having infrared permeability can be obtained by integral moulding using the same resin material, and the outer peripheral surface of the trunk section 11 and the outer peripheral surface of the thin film section 12 are formed such that the outer peripheral surfaces are smoothly connected to each other. The connection portion therebetween is free from a step or a seam.

6 Claims, 6 Drawing Sheets

[Fig. 1]
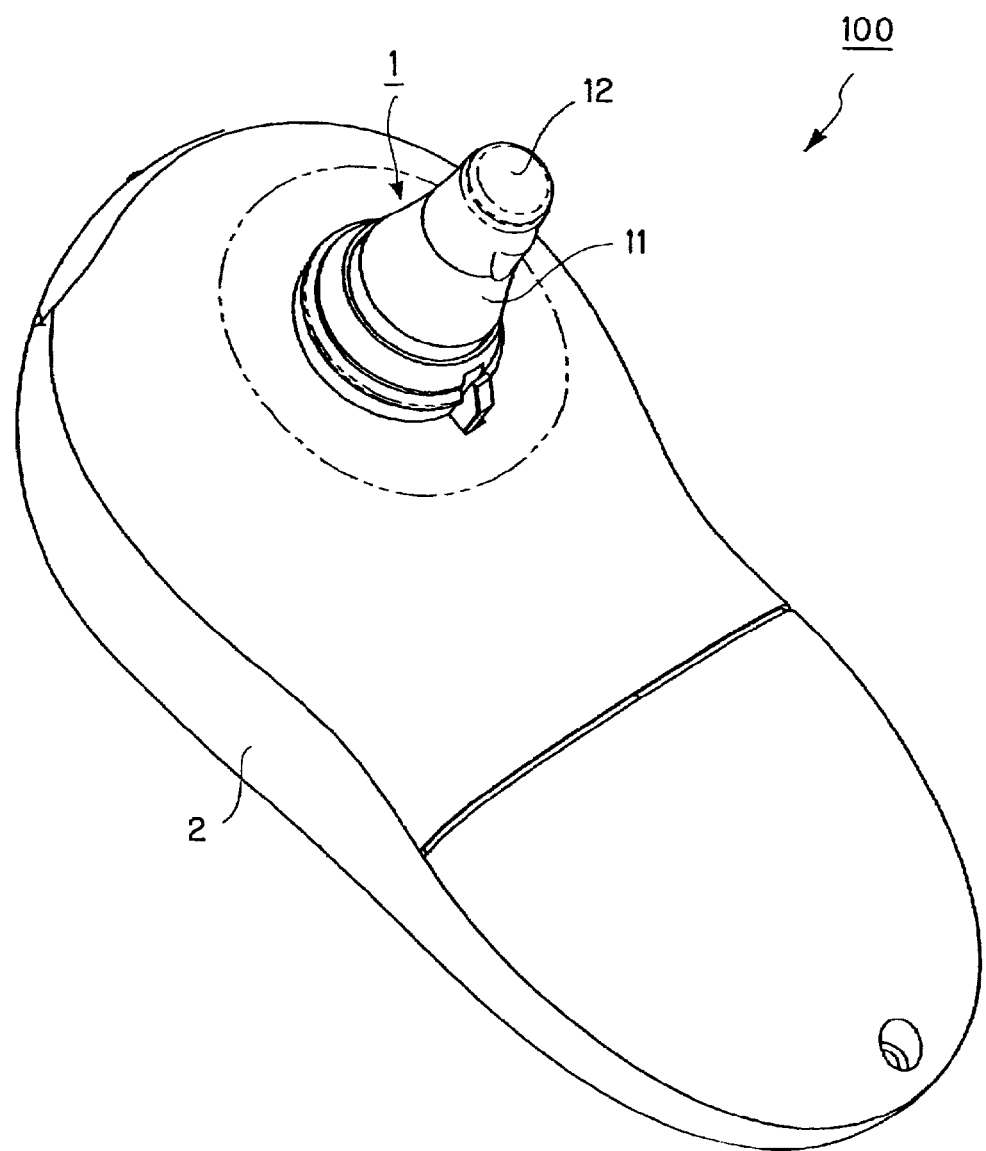

[Fig. 2]
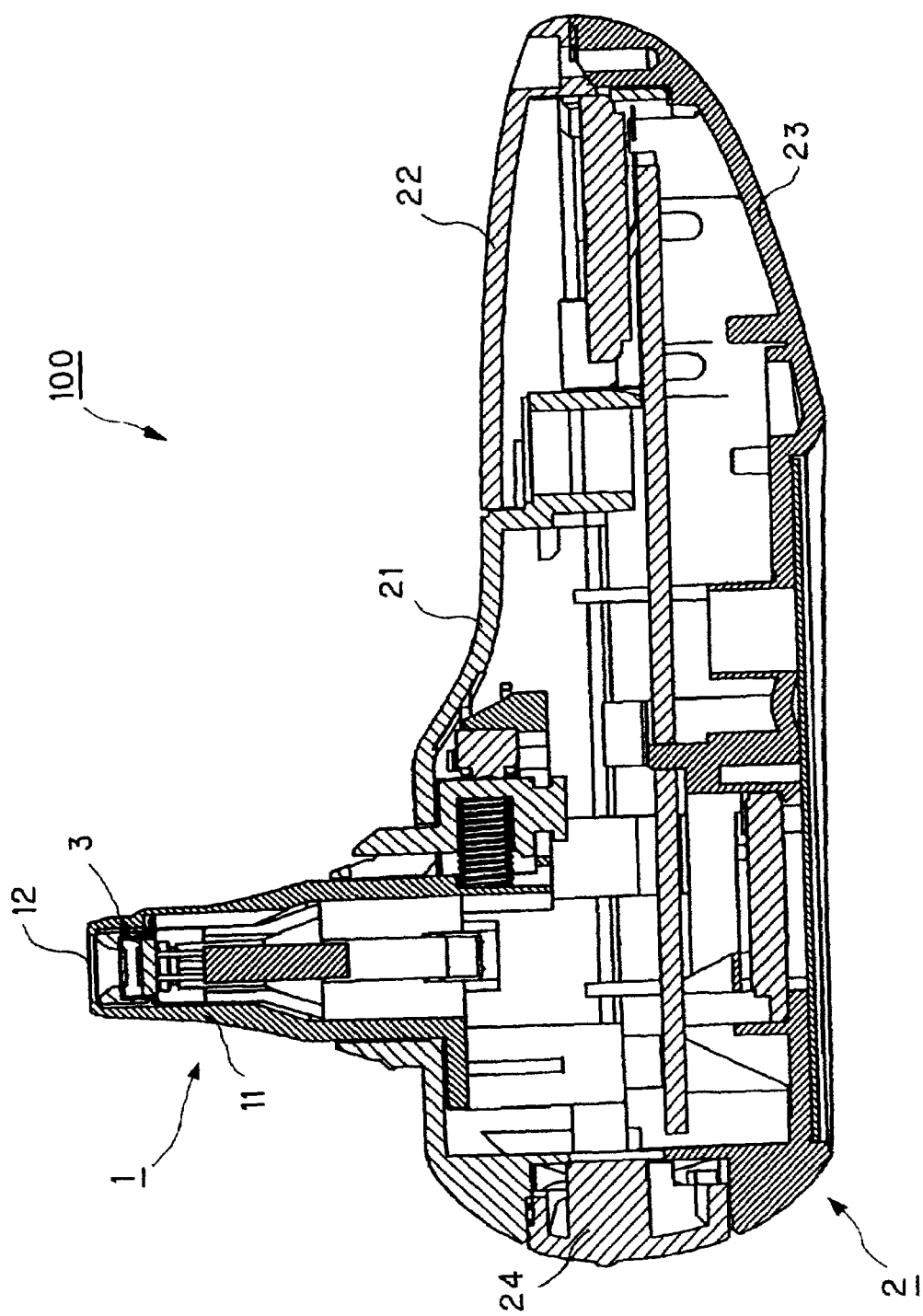

[Fig. 3]
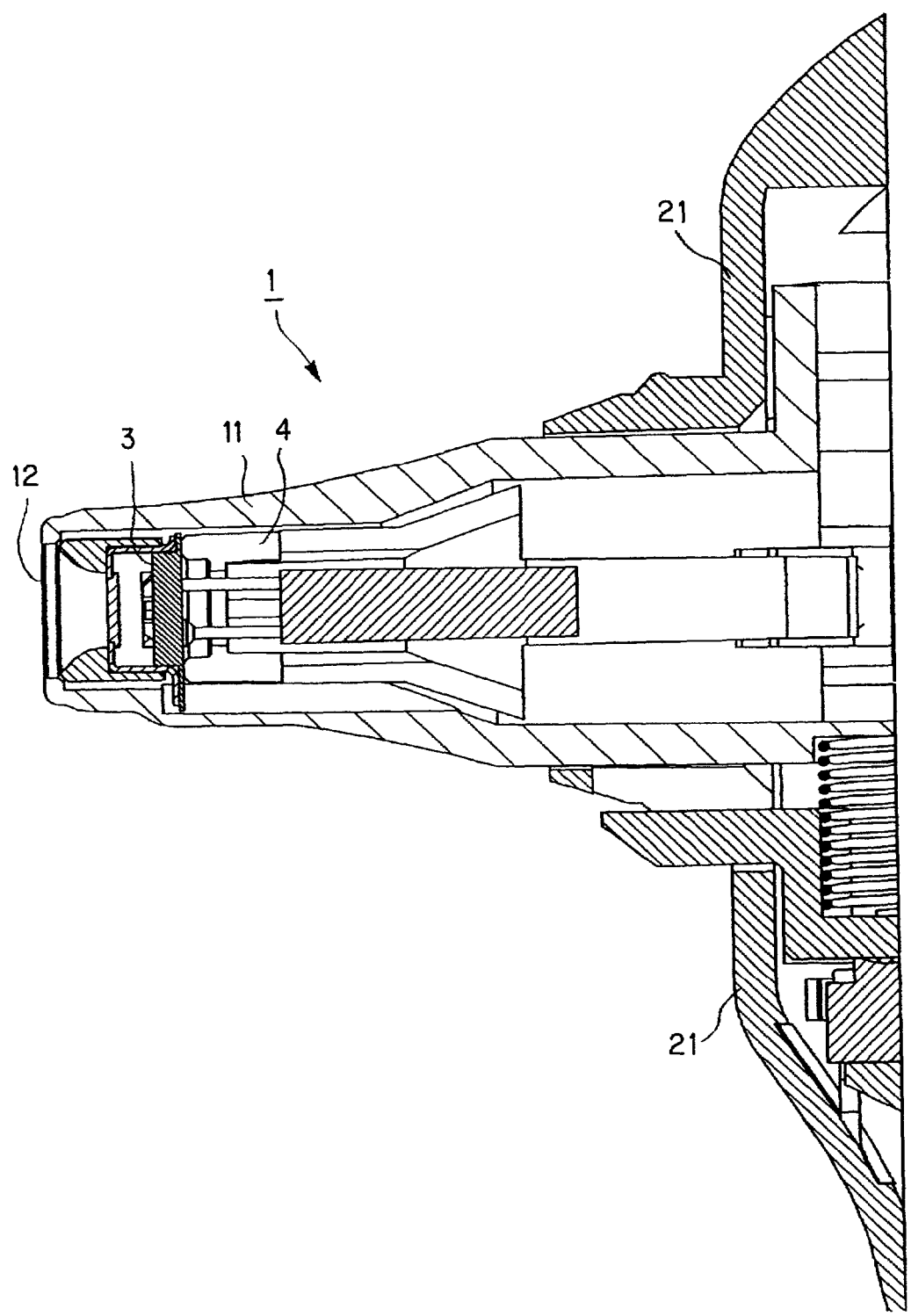

[Fig.4]
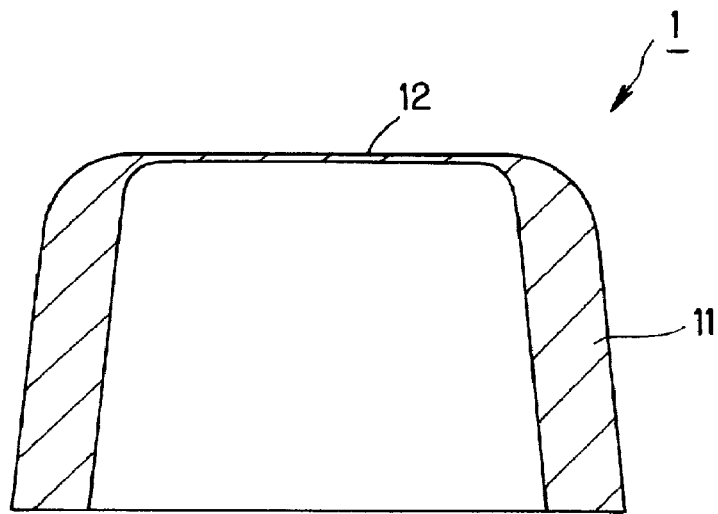
[Fig. 5]
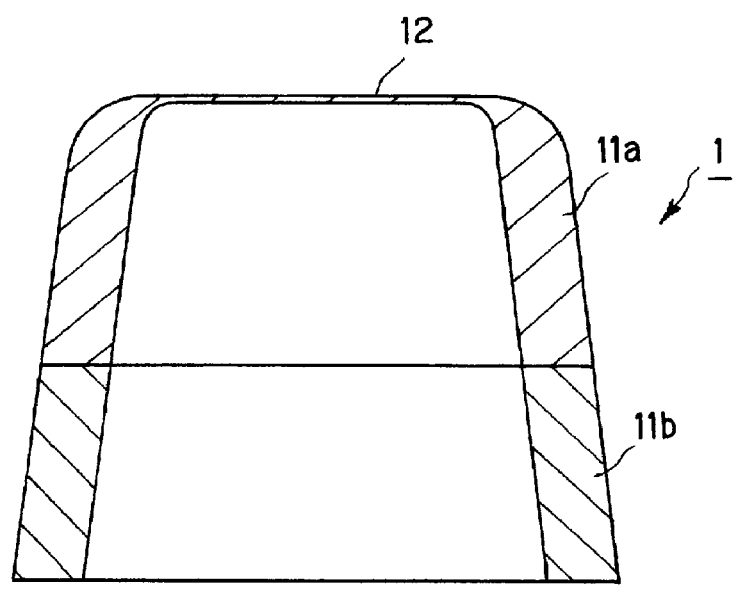

[Fig. 6]
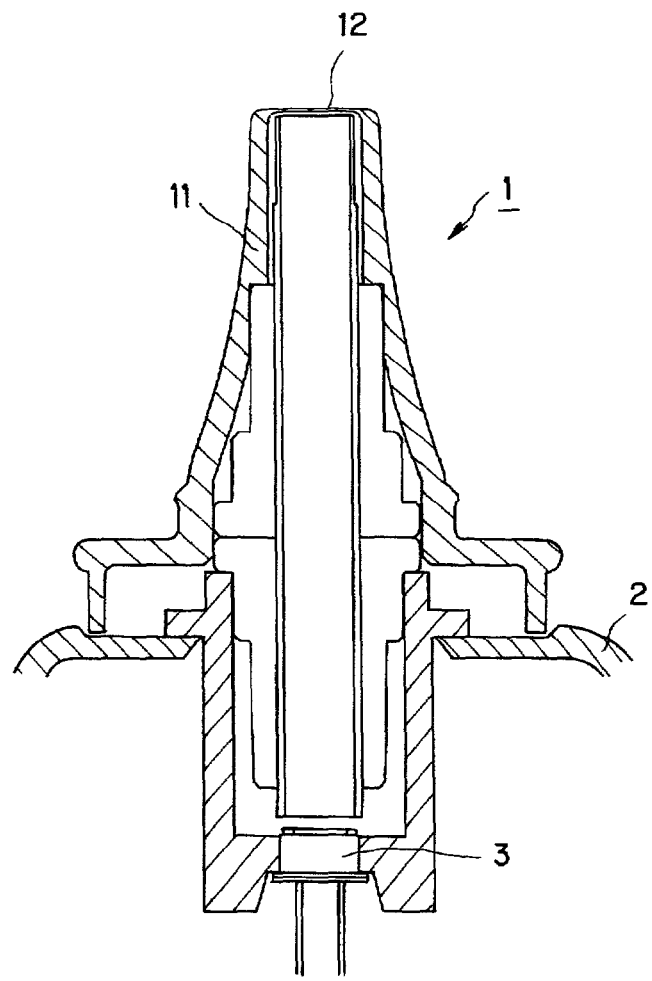
[Fig. 7]
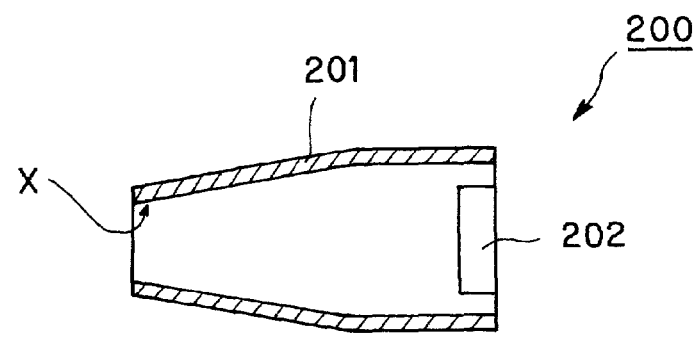

[Fig. 8]
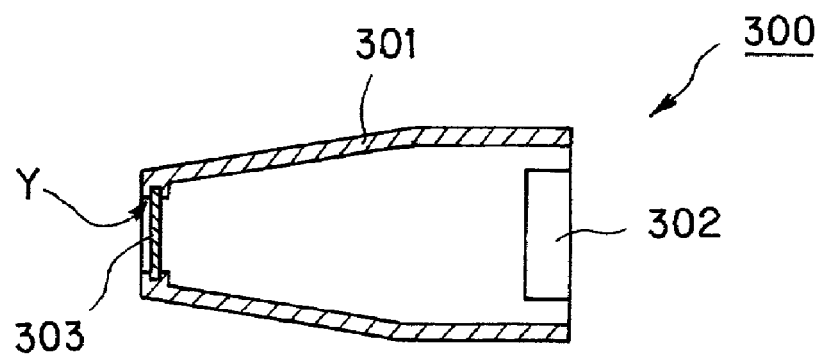
[Fig. 9]
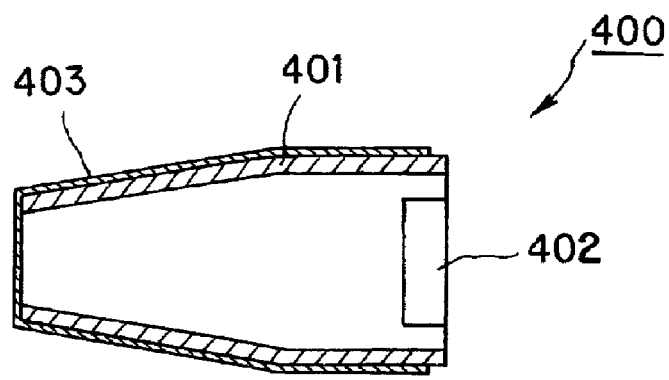

PROBE FOR INFRARED CLINICAL THERMOMETER

BACKGROUND OF THE INVENTION

1. Field of the Invention

The present invention relates to a probe for infrared clinical thermometer arranged in an infrared clinical thermometer which detects infrared rays radiated from an ear drum to measure a body temperature.

2. Description of the Background Art

As conventional probes for infrared clinical thermometer of this type, for example, probes shown in FIGS. 7 to 9 are known.

FIG. 7 is a typical sectional view of a conventional probe for infrared clinical thermometer.

A probe for infrared clinical thermometer 200 shown in FIG. 7 comprises an approximately cylindrical trunk section 201 which is to be inserted into an external ear canal, and an infrared sensor 202 arranged inside the follow of the trunk section 201.

In the probe for infrared clinical thermometer 200 constituted as described above, when the trunk section 201 is inserted into the external ear canal, infrared rays radiated from an ear drum enter from an opening at the distal end of the trunk section 201, and are detected by the infrared sensor 202.

In this manner, a body temperature (ear drum temperature) is measured from the detection result of the infrared sensor 202.

As another technique, a technique disclosed in Japanese Unexamined Patent Publication No. 10-137195 is known. The technique will be described below with reference to FIG. 8. FIG. 8 is a typical sectional view of a probe for infrared clinical thermometer according to a prior art.

A probe for infrared clinical thermometer 300 shown in FIG. 8 comprises an approximately cylindrical trunk section 301 which is to be inserted into an external ear canal, an infrared sensor 302 arranged inside the follow of the trunk section 301, and a filter 303 arranged at the distal end of the trunk section 301.

Since the filter 303 has a nature to transmit infrared rays, as in the probe for infrared clinical thermometer 200 shown in FIG. 7, a body temperature (ear drum temperature) can be measured.

As another technique, a technique disclosed in Japanese Examined Patent Publication No. 6-42872 is known. The technique will be described below with reference to FIG. 9. FIG. 9 is a typical sectional view of a probe for infrared clinical thermometer according to a prior art.

A probe for infrared clinical thermometer 400 shown in FIG. 9 comprises an approximately cylindrical trunk section 401 which is to be inserted into an external ear canal, an infrared sensor 402 arranged inside the follow of the trunk section 401, and a disposable cover 403 which entirely covers the trunk section 401.

Since the disposable cover 403 has a nature to transmit infrared rays, as in the probe for infrared clinical thermometer 200 shown in FIG. 7, a body temperature (ear drum temperature) can be measured.

However, in these prior arts, the following problems are posed.

A probe for infrared clinical thermometer must be sanitarily used. In use of the probe, dirt or the like on the probe needs to be removed by wiping, and sterilization or the like must be performed.

In the probe for infrared clinical thermometer 200 shown in FIG. 7, it is difficult to remove dirt on an inner wall X of the trunk section 201 by wiping and to perform sterilization. In addition, when alcohol sterilization is performed, the alcohol is not easily dried out on the inner wall X. Measurement before the alcohol is dried out makes an error disadvantageously.

In the probe for infrared clinical thermometer 300 shown in FIG. 8, dirt is prevented the filter 303 from being adhered to the inner wall of the trunk section 301. However, dust is accumulated in the joint portion Y because a step or a gap is formed in a joint portion Y between the trunk section 301 and the filter 303, and the joint portion Y is not easily cleaned.

In addition, a structure for fixing and waterproofing the filter 303 is required, and the number of parts increase, so that the cost increases. Furthermore, when silicon glass is used as the material of the filter 303, the silicon glass itself is expensive disadvantageously.

In the probe for infrared clinical thermometer 400 shown in FIG. 9, a problem is not caused by dirt or the like. However, since the disposable cover 403 must be exchanged at every measurement, the cumbersome exchange process increases the cost disadvantageously.

In addition, storage and management of the disposable covers 403 are cumbersome.

SUMMARY OF THE INVENTION

The present invention has been made to solve the problems of the prior arts, and has as its object to provide a probe for infrared clinical thermometer which can easily assure sanitary.

According to the present invention, in order to achieve the object, there is provided a probe for infrared clinical thermometer which detects infrared rays radiated from an ear drum to measure a body temperature including:

a cylindrical trunk section which is constituted by a rigid member and inserted into an external ear canal; and a thin film section which has infrared permeability and which seals the distal end of the cylindrical trunk section, wherein the trunk section and the thin film section are integrally moulded by the same resin material such that the outer peripheral surfaces of the trunk section and the thin film section are smoothly connected to each other.

The "rigid member" mentioned here generally means a member which is not changed in size and shape. However, when the rigid member is used in a device, some change in shape is permitted unless the change in shape does not hinder measurement, a substantially rigid member may be used.

The "outer peripheral surfaces are smoothly connected to each other" means that a step or a seam is not formed in the connection portion between the outer peripheral surface of the trunk section and the outer peripheral surface of the thin film section.

According to the configuration of the present invention, since the outer peripheral surfaces of the trunk section and the thin film section are smoothly connected to each other, dirt on the outer peripheral surfaces can be easily removed by wiping, and can be easily sterilized. In addition, since the trunk section is a substantially rigid member, the trunk section can be used without any problems.

The trunk section may be directly supported to a housing of an infrared clinical thermometer body.

With this configuration, since the trunk section entirely consists of the same material, the structure can be simplified.

The trunk section may be joined to a second trunk section consisting of a material different from a resin material of the trunk section, and second trunk section may be directly supported to the housing of the infrared clinical thermometer body.

According to this configuration, since the material of the trunk section is the same as the material of the thin film section, the material is limited to a material having a nature to transmit infrared rays. However, the second trunk section is not limited to such a material. Therefore, desired functions can be reinforced by the material of the second trunk section. For example, when a material which is good in strength or thermal characteristic is used as the material of the second trunk section, the strength or heat resistance of the probe can be improved.

The length of the trunk section may be not less than such a length that the trunk section is in contact with an external ear canal.

With this configuration, the joint portion between the trunk section and the second trunk section is not in contact with an external ear canal. Therefore, even if dirt or the like is adhered to the joint portion and is not easily removed by wiping, no sanitary problem posed.

The wall thickness of the trunk section is set within a range of 0.6 to 1.5 mm, and the thickness of the thin film section is preferably set within a range of 20 to 100 μm.

The resin material may be polyethylene or polypropylene.

BRIEF DESCRIPTION OF THE DRAWINGS

FIG. 1 is an external perspective view of an infrared clinical thermometer comprising a probe for infrared clinical thermometer according to an embodiment of the present invention.

FIG. 2 is a longitudinal sectional view of the infrared clinical thermometer comprising a probe for infrared clinical thermometer according to the embodiment of the present invention.

FIG. 3 is an enlarged sectional view of the periphery of the probe for infrared clinical thermometer according to the embodiment of the present invention.

FIG. 4 is a typical sectional view of a trunk section and a thin film section which constitute the probe for infrared clinical thermometer according to the embodiment of the present invention.

FIG. 5 is a typical sectional view of a trunk section and a thin film section (modification) which constitute a probe for infrared clinical thermometer according to the embodiment of the present invention.

FIG. 6 is an enlarged sectional view (modification) of the periphery of the probe for infrared clinical thermometer according to the embodiment of the present invention.

FIG. 7 is a typical sectional view of a probe for infrared clinical thermometer according to a prior art.

FIG. 8 is a typical sectional view of a probe for infrared clinical thermometer according to a prior art.

FIG. 9 is a typical sectional view of a probe for infrared clinical thermometer according to a prior art.

DETAILED DESCRIPTION OF PREFERRED EMBODIMENT

A preferred embodiment of the present invention will be illustratively described with reference to the accompanying drawings. The sizes, materials, shapes, and relative arrangements of components described in this embodiment are not limited to only the spirit and scope of the invention unless the sizes, materials, shapes, and relative positions of the components are specifically described.

A probe for infrared clinical thermometer according to an embodiment of the present invention will be described below with reference to FIGS. 1 to 6.

The configuration and the like of an entire infrared clinical thermometer comprising the probe for infrared clinical thermometer according to the embodiment of the present invention will be described below with reference to FIGS. 1 and 2. FIG. 1 is an external perspective view of an infrared clinical thermometer comprising the probe for infrared clinical thermometer according to the embodiment of the present invention, and FIG. 2 is a longitudinal sectional view of the infrared clinical thermometer comprising a probe for infrared clinical thermometer according to the embodiment of the present invention.

An infrared clinical thermometer 100 comprises an infrared clinical thermometer body 2 and a probe for infrared clinical thermometer 1 according to the embodiment of the present invention which is to be inserted into an external ear canal.

The outer wall surface forming the outside of the infrared clinical thermometer body 2 is approximately constituted by a ground housing 21, a front housing 23, and a battery cover 22 for exchanging batteries, and a measurement switch 24 used for a setting.

Since the infrared clinical thermometer itself is a known technique, the details of the infrared clinical thermometer will be omitted. However, a battery arranged section serving as a power supply, a circuit board, a display section for displaying a measurement result, and the like are arranged.

In measurement, the probe for infrared clinical thermometer 1 is inserted into an external ear canal while holding the infrared clinical thermometer body 2 with a hand. In this state, when the measurement switch 24 is depressed, a body temperature (ear drum temperature) can be measured for a short period of time.

The probe for infrared clinical thermometer according to the embodiment of the present invention will be described in detail with reference to FIG. 3. FIG. 3 is an enlarged sectional view of the periphery of the probe for infrared clinical thermometer according to the embodiment of the present invention.

The probe for infrared clinical thermometer 1 comprises a tabular (cylindrical) trunk section 11 which is to be inserted into an external ear canal and a thin film section 12 which seals the distal end of the trunk section 11.

The trunk section 11 is supported by the ground housing 21. The trunk section 11 must be substantially constituted by a rigid member to prevent the trunk section 11 from being deformed in measurement or the like. For this reason, the trunk section 11 needs a sufficiently large wall thickness.

In order to make the trunk section 11 substantially rigid, although it depends on the material of the trunk section 11, when polyethylene or polypropylene is used as a material, a wall thickness falling within a range of 0.6 to 1.5 mm can improve the rigidity, and a substantially required rigid member can be obtained.

The thin film section 12 has infrared permeability. Therefore, when the probe for infrared clinical thermometer 1 is inserted into the external ear canal, infrared rays radiated from an ear drum passes through the thin film section 12 and enters the inside of the cylindrical trunk section 11.

The thickness of the thin film section 12 must be sufficiently small to give to the thin film section 12 such infrared permeability that the thin film section 12 transmits infrared rays required for measurement.

In order to achieve the infrared permeability, although it depends on the material of the thin film section 12, when polyethylene or polypropylene is used as the material, the thickness of the thin film section 12 is set within a range of 20 to 100 μm.

An infrared sensor 3 supported by a sensor holder 4 is arranged inside the trunk section 11. In this manner, infrared transmitted through the thin film section 12 are detected by the infrared sensor 3, and a body temperature (ear drum temperature) is measured on the basis of the detection result.

The trunk section and the thin film section will be described below in detail with reference to FIG. 4. FIG. 4 is a typical sectional view of a trunk section and a thin film section which constitute the probe for infrared clinical thermometer according to the embodiment of the present invention.

As shown in FIG. 4, the thin film section 12 seals the distal end of the trunk section 11 to prevent dirt or the like from entering the inside the trunk section 11.

The trunk section 11 and the thin film section 12 are integrally moulded by the same resin material. As is apparent from FIG. 4, the outer peripheral surface of the trunk section 11 and the outer peripheral surface of the thin film section 12 are constituted such that the outer peripheral surfaces are smoothly connected to each other. More specifically, the connection portion therebetween is free from a step or a seam.

The moulding method is not limited to a specific moulding method. However, for example, the trunk section 11 and the thin film section 12 can be preferably moulded by injection moulding, vacuum moulding, compression moulding, or the like.

In the probe for infrared clinical thermometer 1 constituted as described above, only the outer peripheral surfaces of the trunk section 11 and the thin film section 12 may be in contact with the external ear canal. These outer peripheral surfaces must be sanitary.

However, as described above, since the outer peripheral surface of the trunk section 11 and the outer peripheral surface of the thin film section 12 are smoothly connected to each other, these outer peripheral surfaces have no place where dirt is easily accumulated, wiping up of dirt and sterilization can be easily performed.

For example, alcohol sterilization with alcohol is performed, and the alcohol is wiped off. In this manner, dirt can be easily removed, and sterilization can be performed. When the outer peripheral surfaces are wiped clean with gauze or the like that caused alcohol permeated, the dirt can be easily removed, and sterilization can be performed.

The thin film section 12 itself has low rigidity, but the thin film section 12 is moulded integrally with the trunk section 11 constituted by a rigid member. For this reason, the thin film section 12 does not substantially receive a horizontal force. More specifically, tensility or compressive force does not act on the thin film section 12 in the planar direction.

Therefore, even though the thin film section 12 itself has low rigidity, the thin film section 12 can be used without any problems. More specifically, when the infrared clinical thermometer is used, the probe for infrared clinical thermometer 1 is inserted into an external ear canal. In this case, since the connection portion (arc edge portion) between the trunk section 11 and the thin film section 12 or only the outer peripheral surface of the trunk section 11 is in contact with the external ear canal, force rarely acts on the thin film section 12.

When a projection or the like strongly acts on the thin film section 12, the thin film section 12 may be deformed or broken. However, it is not generally considered that such a situation is caused by the operation that the probe for infrared clinical thermometer 1 is inserted into the external ear canal.

FIGS. 2 to 4 show the configuration of the trunk section 11 being directly supported by the housing (ground housing 21) of the infrared clinical thermometer body. In this manner, the trunk section of the probe for infrared clinical thermometer can be constituted by a single material, and the constitution can be simplified advantageously.

In contrast to this, the trunk section can also be constituted by a plurality of members. An example of the configuration will be described below with reference to FIG. 5. FIG. 5 is a typical sectional view of a trunk section and a thin film section (modification) which constitute a probe for infrared clinical thermometer according to the embodiment of the present invention.

In the example shown in FIG. 5, a trunk section is constituted by a structure obtained by joining a trunk section 11a corresponding to the trunk section 11 and a second trunk section 11b to each other. The trunk section 11a and the second trunk section 11b can be joined to each other by, e.g., ultrasonic welding or the like.

The trunk section 11a and the thin film section 12 are integrally moulded by the same resin material as in the above case. The outer peripheral surface of the trunk section 11a and the outer peripheral surface of the thin film section 12 are smoothly connected to each other, and the connection portion therebetween is free from a step or a seam.

Therefore, the same effect as described above can be obtained.

The trunk section 11a and the thin film section 12 consist of the same resin material, and the thin film section 12 must transmit infrared rays. For this reason, the resin material is limited to specific resin ones.

Therefore, it may be difficult to achieve a function except for the function of infrared permeability.

Therefore, according to the configuration shown in FIG. 5, the material of the second trunk section 11b makes it possible to improve other functionality.

For example, as the material of the trunk section 11a and the thin film section 12, as described above, polyethylene is used, and an ABS resin which is good in strength and thermal characteristic is used as the material of the second trunk section 11b, so that the function of dimensional stability can be reinforced.

However, it is technically very difficult in the art that the joint portion between the trunk section 11a and the second trunk section 11b is completely free from a step or a seam.

Therefore, the length of the trunk section 11a must be set to not less than a length (generally 15 mm or more) that the trunk section 11a can be in contact with (inserted into) an external ear canal.

In this manner, even if dirt or the like adhered to the joint portion between the trunk section 11a and the second trunk section 11b which is not easily removed by wiping, a problem on sanitation is not caused because the joint portion is not in contact with the external ear canal.

FIG. 6 shows one modification. FIG. 6 is an enlarged sectional view (modification) of the periphery of the probe for infrared clinical thermometer according to the embodiment of the present invention.

In the configuration shown in FIGS. 2 and 3, the infrared sensor 3 is arranged in the inner area of the trunk section 11. However, FIG. 6 shows a configuration in which the infrared sensor 3 is arranged inside the infrared clinical thermometer body 2.

These configurations are different from each other in only arrangement, have the same basic functions as a matter of course. As the characteristic feature of the embodiment of the present invention, the trunk section 11 and the thin film section 12 are integrally moulded by the same resin material. The outer peripheral surface of the trunk section 11 and the outer peripheral surface of the thin film section 12 are constituted such that the outer peripheral surfaces are smoothly connected to each other, and the connection portion thereof is free from a step or a seam, as in the configuration shown in FIGS. 2 and 3. Therefore, the same effect as described above can be obtained.

As has been described above, in the probe for infrared clinical thermometer according to the embodiment, dirt can be easily removed by wiping, and sterilization is very easily performed. In addition, since the probe for infrared clinical thermometer does not need a disposable cover or the like, the cost is not increased.

What is claimed is:

1. A probe for an infrared clinical thermometer which detects infrared rays radiated from an ear drum to measure a body temperature comprising:
    a cylindrical trunk section comprising a rigid member for insertion into an external ear canal; and
    a thin film section which has infrared permeability for sealing the distal end of the cylindrical trunk section,
    wherein the cylindrical trunk section and the thin film section of the probe are integrally molded by the same resin material such that the outer peripheral surfaces of the cylindrical trunk section and the thin film section are smoothly connected to each other.

2. A probe for an infrared clinical thermometer according to claim 1, wherein the cylindrical trunk section is directly supported to a housing of an infrared clinical thermometer body.

3. A probe for an infrared clinical thermometer according to claim 1, wherein the cylindrical trunk section is joined to a second trunk section by a material different from the resin material of the cylindrical trunk section, and the second trunk section is directly supported to the housing of the infrared clinical thermometer body.

4. A probe for an infrared clinical thermometer according to claim 3, wherein the length of the cylindrical trunk section is not less than such a length that the cylindrical trunk section is in contact with an external ear canal.

5. A probe for an infrared clinical thermometer according to any one of claims 1 to 4, wherein the cylindrical trunk section has a thickness that is within a range of 0.6 to 1.5 mm, and the thickness of the thin film section is within a range of 20 to 100 μm.

6. A probe for an infrared clinical thermometer according to any one of claims 1 to 4, wherein the resin material is selected from the group consisting of polyethylene and polypropylene.

* * * * *